United States Patent
Walke et al.

(10) Patent No.: US 8,818,428 B2
(45) Date of Patent: Aug. 26, 2014

(54) APPARATUS AND METHOD FOR EMPLOYING A PAGE CYCLE LEARNING MODE

(71) Applicant: Qualcomm Incorporated, San Diego, CA (US)

(72) Inventors: Simon Walke, Basingstoke (GB); Nicholas J. Tebbit, Farnborough (GB)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/669,692

(22) Filed: Nov. 6, 2012

(65) Prior Publication Data

US 2013/0237257 A1 Sep. 12, 2013

Related U.S. Application Data

(60) Provisional application No. 61/608,532, filed on Mar. 8, 2012.

(51) Int. Cl.
*H04W 68/02* (2009.01)
(52) U.S. Cl.
USPC .......................................... 455/458; 370/329
(58) Field of Classification Search
CPC ........................... H04W 68/02; H04W 52/0216
USPC ............................ 455/458, 509; 370/329, 331
See application file for complete search history.

(56) References Cited

U.S. PATENT DOCUMENTS

| | | | |
|---|---|---|---|
| 2009/0186651 A1 | 7/2009 | You | |
| 2009/0215472 A1 | 8/2009 | Hsu | |
| 2009/0310503 A1 | 12/2009 | Tenny et al. | |
| 2010/0035624 A1 | 2/2010 | Tseng | |
| 2010/0091720 A1* | 4/2010 | Chun et al. | 370/329 |
| 2010/0203906 A1 | 8/2010 | Fang et al. | |
| 2011/0039553 A1 | 2/2011 | Willey | |
| 2011/0130100 A1 | 6/2011 | Chen et al. | |

FOREIGN PATENT DOCUMENTS

| | | |
|---|---|---|
| EP | 2432288 A1 | 3/2012 |
| EP | 2432288 A1 | 3/2012 |
| JP | 2005260906 A | 9/2005 |

OTHER PUBLICATIONS

International Search Report and Written Opinion—PCT/US2013/029663—ISA/EPO—May 22, 2013.
120682JP—Translation of Japanese Office Action Issued Apr. 1, 2014 (Application No. 2014-505417).
120682JP—Japanese Office Action Issued Apr. 1, 2014 (Application No. 2014-505417).

* cited by examiner

*Primary Examiner* — Phuoc H Doan
(74) *Attorney, Agent, or Firm* — QUALCOMM IP Department; James Hunt Yancey, Jr.

(57) ABSTRACT

Apparatus and methods are disclosed to provide for a multi-SIM wireless user equipment configured for discontinuous reception (DRX) utilizing two or more subscriptions, which may be in different radio access technologies. The user equipment is configured to originate a call using one subscription, to the same user equipment over another subscription. During the duration of a blanking window, statistics corresponding to repetitions of incoming page messages are recorded and analyzed to determine repetition behavior by the network of page messages. In this way, monitoring of the paging channel can be done during fewer than all DRX cycles, combating possible collisions between DRX cycles on different radio access technologies, and enabling reduced power consumption. Other aspects, embodiments, and features are also claimed and described.

18 Claims, 10 Drawing Sheets

APPARATUS AND METHOD FOR EMPLOYING A PAGE CYCLE LEARNING MODE

CROSS-REFERENCE TO RELATED APPLICATION & PRIORITY CLAIM

This application claims priority to and the benefit of U.S. Provisional Patent Application No. 61/608,532, filed in the United States Patent and Trademark Office on Mar. 8, 2012, the entire content of which is incorporated herein by reference as if fully set forth below and for all applicable purposes.

TECHNICAL FIELD

Aspects of the present disclosure relate generally to wireless communication systems, and more particularly, to discontinuous reception of broadcast messages in a wireless communication system.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In any wireless communications technology, power consumption at the mobile wireless device is an important issue for which substantial effort continues to be placed. Many conventional wireless communications technologies utilize discontinuous reception (DRX), which may alternately be referred to as a slotted mode, to save power.

In a DRX mode, a device's varies power usage. For example, a device's receiver is generally turned off to save power and turned on during predetermined periods of time when it is known that messages directed to the device may be received. In some examples the turning on and off of the receiver (the DRX cycle) may be periodic, while other examples may utilize other nonperiodic timing between on-times. On some wireless channels, such as a paging channel, the network may repeat some information across several DRX cycles to maximize the probability that a receiving device receives that information and can accordingly act on it.

As demand for mobile broadband access continues to increase, research and development continue to advance UMTS technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to some embodiments, the present invention provides a method of wireless communication operable at a user equipment capable of communicating over two different subscriptions. Such a method can include various features, including: transmitting a call origination message utilizing a first subscription, the call origination message configured to call the user equipment over the second subscription; receiving over the second subscription at least one paging message corresponding to the call origination message; storing information associated with the at least one paging message; and determining a statistic corresponding to repetition of the at least one paging message.

Other embodiments can include wireless communication devices capable of communicating on multiple wireless networks with multiple subscriptions. For example, a wireless communication device can comprise: a communications interface configured for wireless communication; and a processor module operably coupled to the communications interface and configured for managing communications over two different subscriptions. The processor can be configured for transmitting a call origination message utilizing a first subscription, the call origination message configured to call the user equipment over the second subscription; receiving over the second subscription at least one paging message corresponding to the call origination message; storing information associated with the at least one paging message; and determining a statistic corresponding to repetition of the at least one paging message.

Other embodiments of the present invention can include memories or other mediums containing code. For example, an embodiment can include an article of manufacture configured for use with a user equipment capable of enabling communication over two different subscriptions comprising a set of instructions stored on a storage device. When a processor executes the code it can be caused to: transmit a call origination message utilizing a first subscription, the call origination message configured to call the user equipment over the second subscription; receive over the second subscription at least one paging message corresponding to the call origination message; store information associated with the at least one paging message; and determine a statistic corresponding to repetition of the at least one paging message.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

One or more aspects of the disclosure provide for a multi-SIM wireless user equipment (UE) configured for discontinuous reception (DRX) utilizing two or more subscriptions, which may be in different radio access technologies (RAT). A passive scan mode and an active scan mode are disclosed. In the active scan mode, the UE is configured to originate a call utilizing one subscription, to the same UE over another subscription. During the duration of a blanking window, statistics corresponding to repetitions of incoming page messages are recorded and analyzed to determine repetition behavior by the network of page messages. In this way, monitoring of the paging channel can be done during fewer than all DRX cycles, combating possible collisions between DRX cycles on different radio access technologies, and enabling reduced power consumption.

Figure 1:
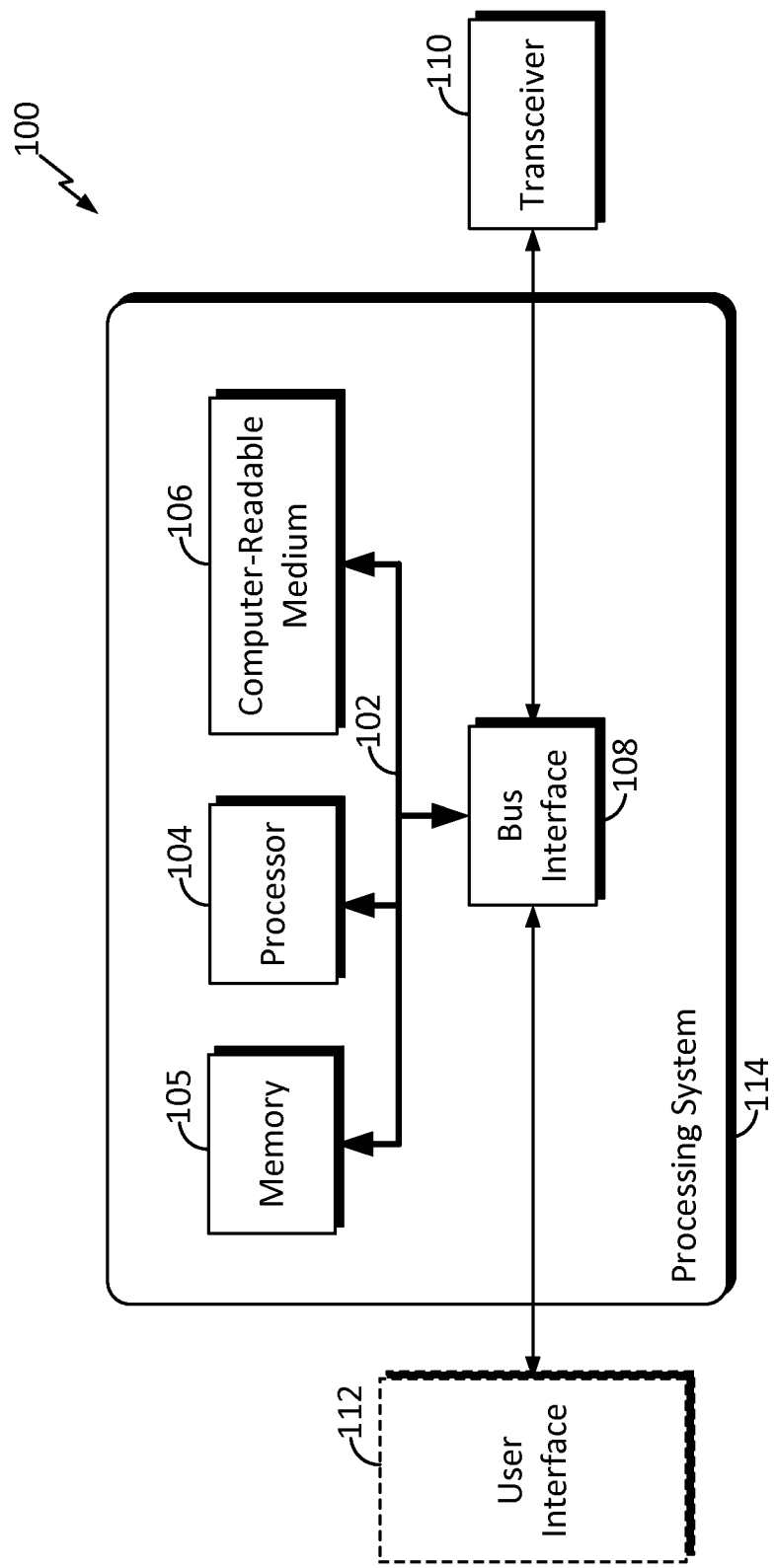
FIG. 1 is a block diagram illustrating an example of a hardware implementation for an apparatus employing a processing system according to some embodiments of the present invention.

FIG. 1 is a block diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
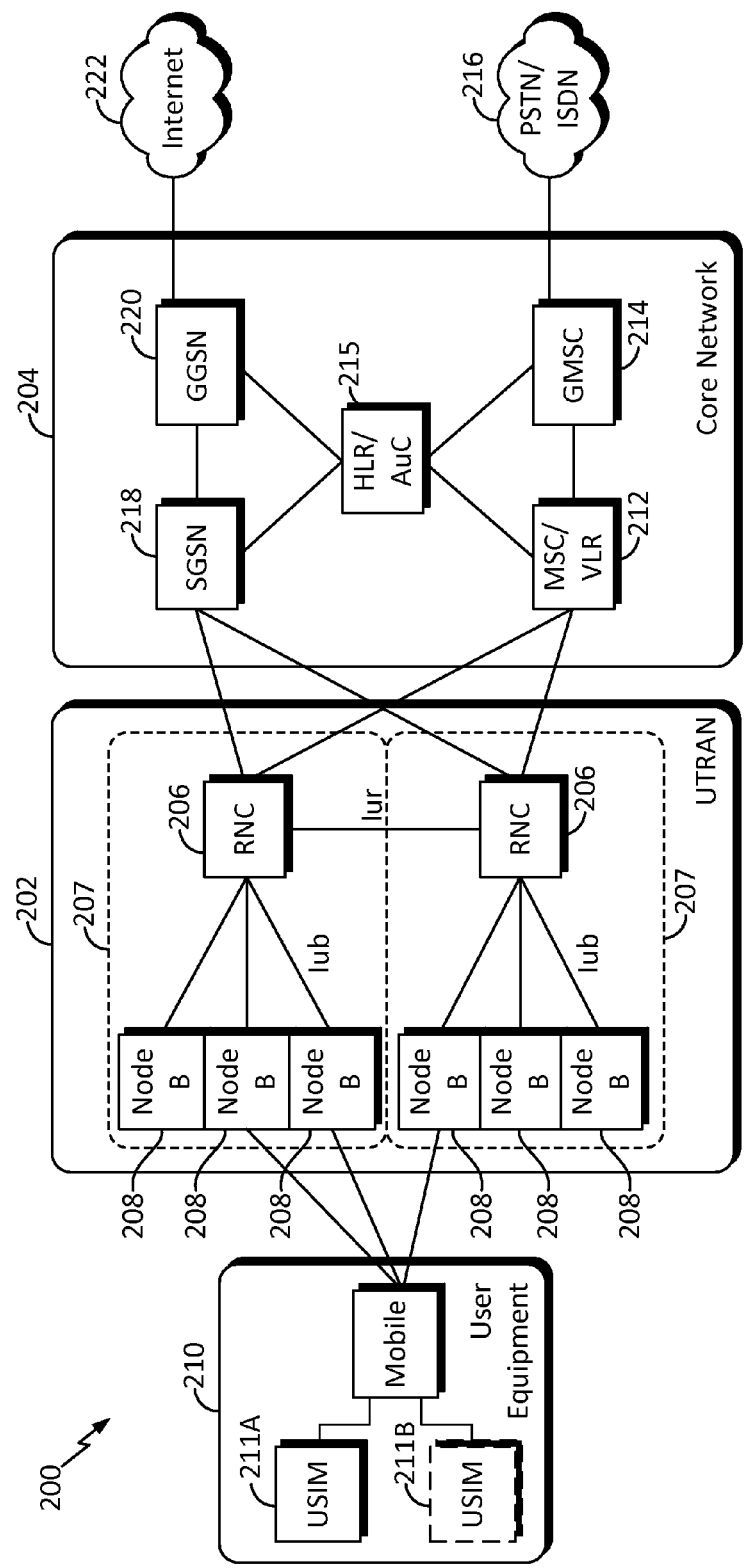
FIG. 2 is a block diagram conceptually illustrating an example of a telecommunications system according to some embodiments of the present invention.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

In a UMTS system, the UE 210 may include one or more universal integrated circuit cards (UICC). The UICC cards may each run one or more universal subscriber identity module (USIM) applications 211. A USIM provides a user's subscription information to a network. The illustrated UE 210 includes two USIMs 211A and 211B, but those of ordinary skill in the art will understand that this is illustrative in nature only, and a UE may include any suitable number of USIMs. UEs such as the UE 210 having multiple USIMs are sometimes referred to as multi-SIM/multiple standby devices, with one particular with two USIMs example being called dual SIM dual standby (DSDS). A DSDS device is generally capable of being active on two networks simultaneously in standby mode, where a single transceiver at the UE 210 is shared by two subscriptions on the respective networks.

For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

As described above, the illustrated UE 210 shows a DSDS device capable of maintaining two subscriptions on the UMTS network. 200. Within the scope of the present disclosure, similar functionality may be achieved utilizing more than one radio access technology (RAT), wherein the UE simultaneously maintains two or more subscriptions on two or more different RATs. Here, such a UE may maintain one or more subscriptions on one or more of a UMTS network, a GSM network, an LTE network, a cdma2000 network, a Wi-MAX network, or any other suitable RAT. Within the present disclosure, DSDS devices, multi-SIM/multiple standby devices, or any device capable of monitoring channels on two or more subscriptions on any one or any plural number of RATs is generally referred to as a multiple standby device.

On a multiple standby UE 210, compromises are typical to allow sharing of the radio transceiver between two or more separate user subscriptions. That is, the UE 210 generally cannot be guaranteed to be listening to all of the required radio channels for each subscription at the same time, and thus, may miss paging messages on one subscription when listening to the other subscription. Most cellular network implementations do allow for broadcast information (such as paging) to be repeated a finite number of times over multiple cycles, but do not provide any mechanism for the subscriber devices to know what this repetition pattern might be. Thus, as described in further detail below, some aspects of the present disclosure provide a mechanism for a UE such as the UE 210 to learn the repetition pattern of broadcast information, enabling algorithms that can increase the likelihood of receiving all paging messages on each subscription.

Figure 3:
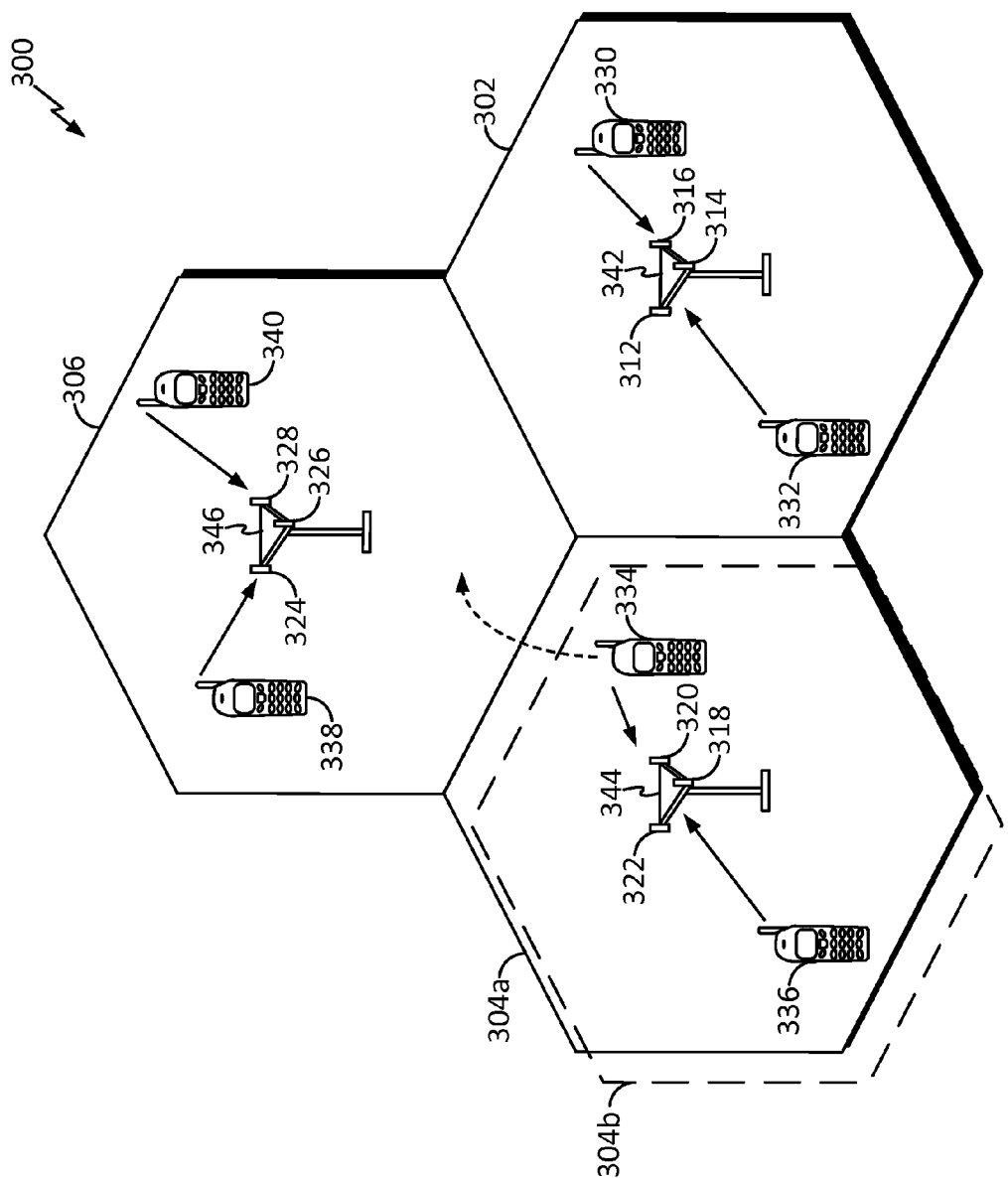
FIG. 3 is a conceptual diagram illustrating an example of an access network according to some embodiments of the present invention.

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 4:
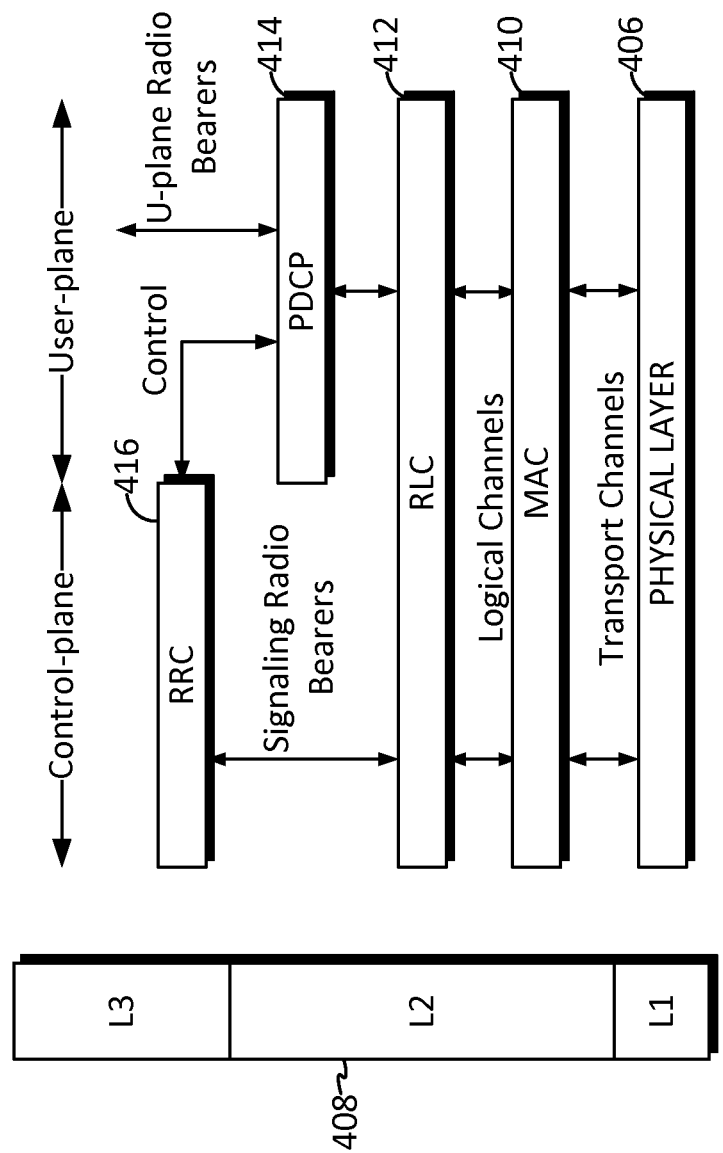
FIG. 4 is a conceptual diagram illustrating an example of a radio protocol architecture for the user and control plane according to some embodiments of the present invention.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and Node B 208 over the physical layer 406.

At Layer 3, the RRC layer 416 handles the control plane signaling between the UE 210 and the Node B 208. RRC layer 416 includes a number of functional entities for routing higher layer messages, handling broadcasting and paging functions, establishing and configuring radio bearers, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 5:
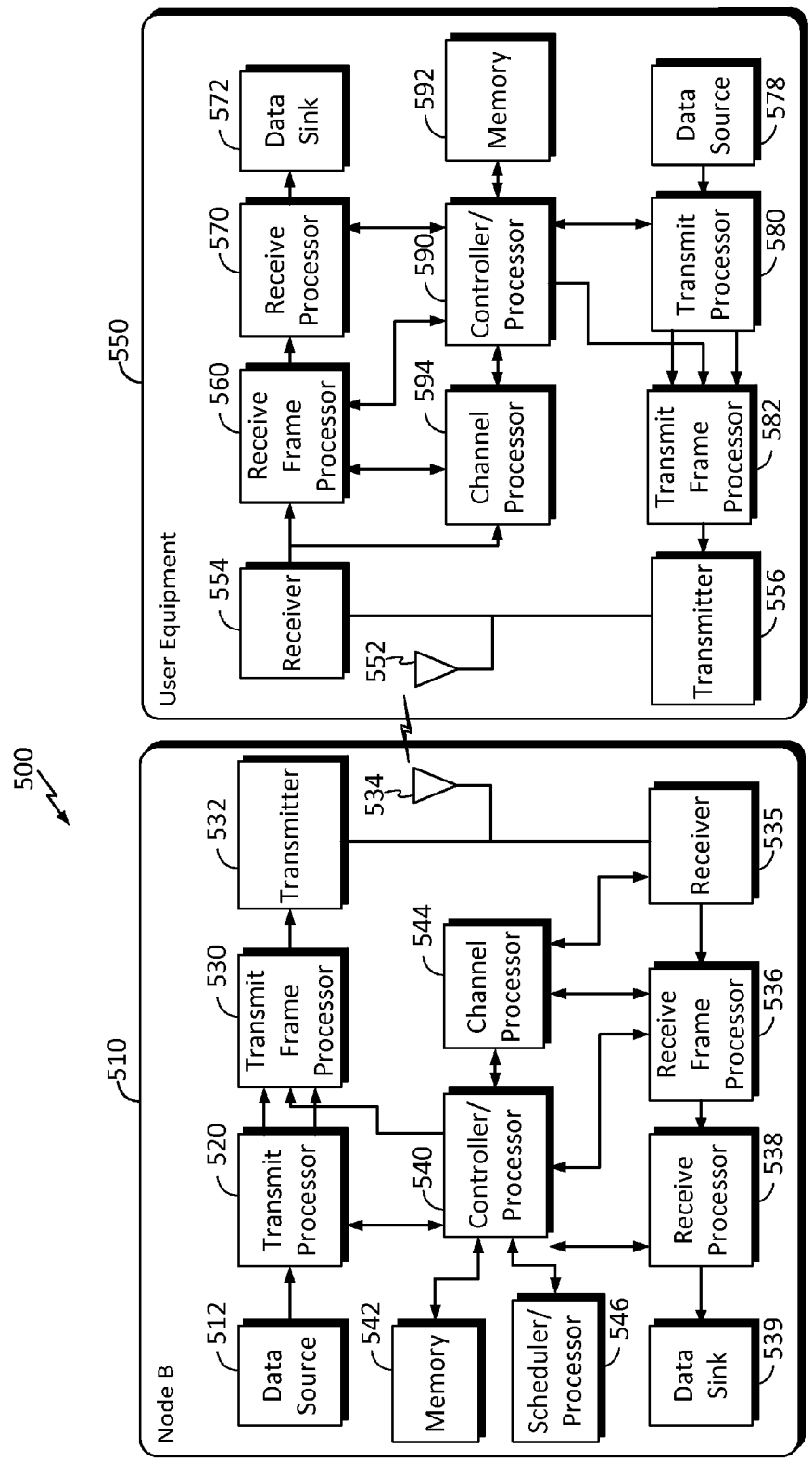
FIG. 5 is a block diagram conceptually illustrating an example of a Node B in communication with a UE in a telecommunications system according to some examples.

FIG. 5 is a block diagram of an exemplary Node B 510 in communication with an exemplary UE 550, where the Node B 510 may be the Node B 408 in FIG. 4, and the UE 550 may be the UE 410 in FIG. 4. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Figure 6:
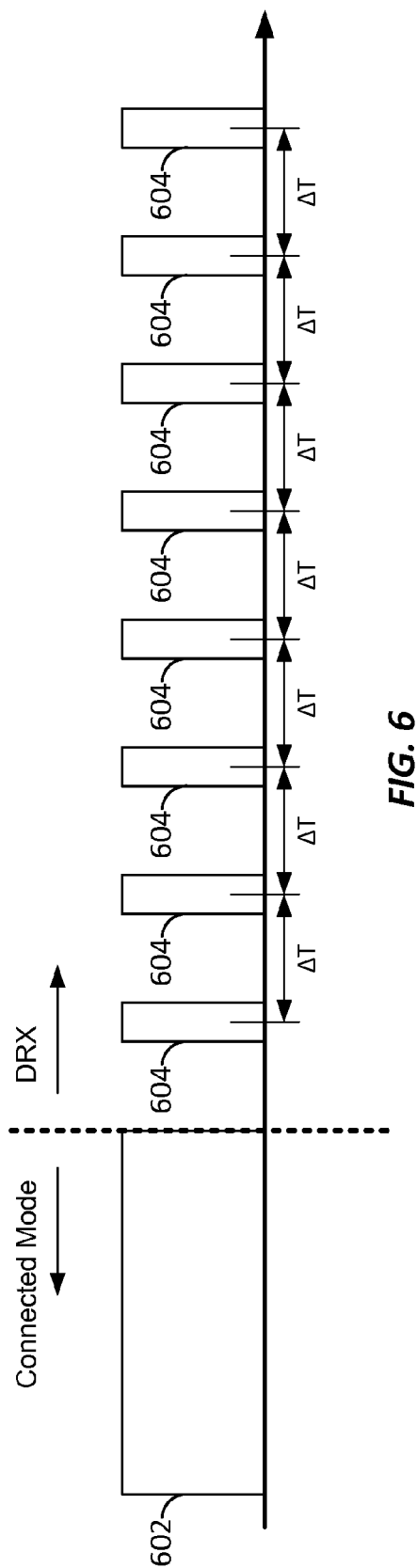
FIG. 6 is a timing diagram conceptually illustrating a DRX feature according to one example.

For many wireless technologies, there exists a concept of "discontinuous reception" (DRX) (also sometimes referred to as a slotted mode). In DRX mode, a UE, such as UE 550, can enter a low-power state where the UE can generally shut off its receiver 554 to save power, and wake up at regular intervals to monitor the paging/broadcast channels for certain downlink messages. FIG. 6 is a timing diagram conceptually illustrating a DRX feature as it might be implemented in a conventional UMTS system. In FIG. 6, a UE 550 may be in a connected mode 602, wherein its receiver 554 is on continuously, to monitor what might be continuous transmissions on one or more downlink channels. Of course, having the receiver 554 continuously on may not be needed when the UE 550 transitions from the connected mode to a low-power state (e.g., a CELL_PCH mode), and thus, the UE 550 may utilize a DRX feature to turn off the receiver 554 when not needed, and wake up for periods 604 corresponding to scan windows 604, during which it monitors for page messages directed to that UE 550. If a page message is received, the UE 550 may react by setting up a call with the network or responding to the page message, or performing other suitable procedures. On the other hand, if no page message for the UE 550 is received, the receiver 554 may be shut back off until the next wake-up period.

In the illustration, the scan windows 604 each have an equal duration, and are periodic with a period of ΔT. Of course, the duration of the scan windows 604, and the period of these scan windows 604 may be of any suitable value, and in various examples, each may be fixed, or may vary with time.

While DRX can substantially reduce power consumption relative to non-DRX systems, there is of course always a desire further to reduce power consumption. Monitoring relevant channels during each DRX cycle utilizes a certain amount of power, and this amount is sought to be reduced.

Moreover, when the UE 550 is a multiple standby device, described above, if each RAT on which the UE 550 is subscribed supports DRX, then it is possible that paging or broadcast messages transmitted to the mobile device during the DRX receive window using one of the RATs might be missed when the UE 550 is currently utilizing the other RAT.

On some wireless channels, such as those channels used for paging and/or those used for broadcast system information, the network transmitting the information may be configured to repeat some or all of that information across several DRX cycles, in order to maximize the probability that the UE 550 has received that information. As a simple example, a page message directed to the UE 550 may be repeated over four consecutive DRX cycles. However, only one instance of the information is generally required in order for the UE 550 to act on it. That is, as long as the UE 550 receives the page message in one of the four repetitions, it can suitably respond without necessarily receiving the other repetitions of the page message.

Thus, in accordance with an aspect of the present disclosure, a UE 550 may be configured to learn the repetition patterns used by the respective networks, so that the UE 550 may more confidently listen for such messages during fewer than all DRX cycles that contain the repetitive information. For example, even if the UE 550 were to miss one or two DRX cycles on a first subscription because it is listening to a second subscription, if the UE 550 knows that the message on the first subscription is repeated over three consecutive DRX cycles, it can be more confident that such a broadcast would not be missed.

This paradigm can improve the reliability of a multiple standby UE 550, since such a UE 550 would have information relating to just how many DRX cycles can be missed without necessarily missing any message transmitted during a plurality of DRX cycles. Thus, such a UE 550 may be enabled to prioritize its activities among the multiple subscriptions, while maintaining a high level of confidence that it would provide a sufficiently high user experience for paging performance.

Those of ordinary skill in the art will comprehend upon a review of the present disclosure that a UE need not necessarily support multi-SIM/Multiple Standby operation to benefit from the determination of the repetition pattern. That is, any UE capable of determining the repetition pattern of transmitted messages across a plurality of DRX cycles may only turn on its receive unit during fewer than all of the DRX cycles, utilizing such a pattern as to have increased confidence that it may still receive all transmitted messages by listening during at least one of the DRX cycles during which any message would be transmitted.

In accordance with some aspects of the disclosure described in further detail below, a "passive scan mode" may be utilized to passively monitor information transmitted over wireless channels, and to determine the repetition pattern for messages repeated over a plurality of DRX cycles. In accordance with additional aspects of the present disclosure described in further detail below, an "active scan mode" may be utilized by a multiple standby device to utilize one subscription to initiate a call directed to another subscription, such that incoming information such as page messages corresponding to that call can be monitored over a plurality of DRX cycles determine the repetition pattern for such messages. In any particular implementation, a UE 550 configured in accordance with the present disclosure may implement either or both of these modes.

As described above, some aspects of the disclosure relate to paging notification messages. In one illustrative example utilizing a UMTS network, a paging channel (PCH) is utilized to carry these paging notification messages, and a paging indicator channel (PICH) is utilized in association with the PCH to enable a UE quickly to determine whether it needs to read the PCH during its associated paging occasion.

Here, once a UE registers on the network, it is allocated to a paging group. The PICH carries paging indicators corresponding to each paging group, so that when there are page messages for any of the UEs in the paging group, the corresponding paging indicator is transmitted on the PICH. When a UE detects its paging indicator, it decodes the PCH to determine whether the corresponding page message is directed to that UE.

In another illustrative example utilizing a GSM network, a UE monitors a paging channel PCH at certain paging blocks corresponding to a paging group and a control channel set to which the UE belongs.

Of course, the UMTS and GSM examples are only two of many possible networks that transmit paging messages to UEs or other mobile devices. In general, including both the UMTS and GSM examples described above, the UE 550 is capable of distinguishing between paging messages that are addressed to itself, and those addressed to other devices within its paging group. That is, within the PCH, there is sufficient information for the UE 550 to determine that a particular paging message is intended for that UE 550 or for another UE within the paging group.

Thus, various aspects of the disclosure enable a UE 550 to scan broadcasted information on the PCH directed to the same UE 550 or directed to other UEs, in order to determine certain statistics, such as the existence of any patterns relating to the repetition of the transmitted information over plural DRX cycles.

In some aspects of the disclosure, in either of the passive scan mode or in the active scan mode, described in further detail below, the UE 550 may determine certain statistics corresponding to the repetition of the paging information. For example, the UE 550 may determine values corresponding to the following:

$N_r$: the minimum number of times that a network will repeat any single paging attempt; and $\{T_1, \ldots T_{Nr-1}\}$: a set of times between each of these repetitions.

Here, each $T_i$ in the set $\{T_1, \ldots T_{Nr-1}\}$ represents the time between one page transmission and the next repetition of the same page transmission.

Figure 7:
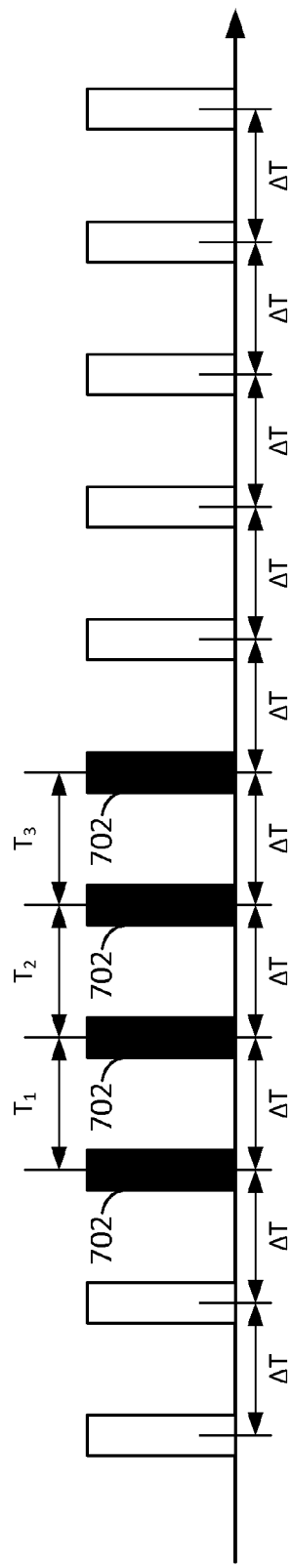
FIG. 7 is a timing diagram conceptually illustrating a page message being repeated over multiple DRX cycles according to one example.

FIG. 7 is a timing diagram illustrating a page message being repeated over four consecutive DRX cycles 702. That is, in this example, $N_r=4$. Further, in this example, the DRX cycle is constant, with each cycle separated by the time $\Delta T$. Thus, $T_1=T_2=T_3=\Delta T$.

Of course, this is merely one example, and a repetition pattern may vary in other examples within the scope of the disclosure. That is, it is possible that the time $T_i$ between repetitions of the same page transmission may vary.

Furthermore, the number of times $N_r$ that the paging message is repeated, and the times $T_i$ between each repetition, can depend not only on the implementation at a particular base station but can also depend on other factors, such as paging channel loading at that base station. For example, it may be the case that during off-peak periods the base station repeats the paging message, while during peak periods it may not. In such an example, the UE 550 may be configured to adapt the paging channel monitoring algorithm over the course of the day. For example, a passive or active scan mode, described below, may be implemented multiple times throughout the day, modifying the respective values of $N_r$ and $T_i$ as needed to adapt to changes in the repetition statistics of the network over the day.

In accordance with an aspect of the disclosure wherein a UE 550 utilizes a passive scan mode, the UE 550 may enter a learning mode, where it may passively monitor its paging channel and store information about page messages directed to any UE that may appear in that paging channel. In this way, over time, as such information is collected by the UE 550, it may generate suitable statistics that can be utilized to determine the $N_r$ and $T_i$ values described above.

Figure 8:
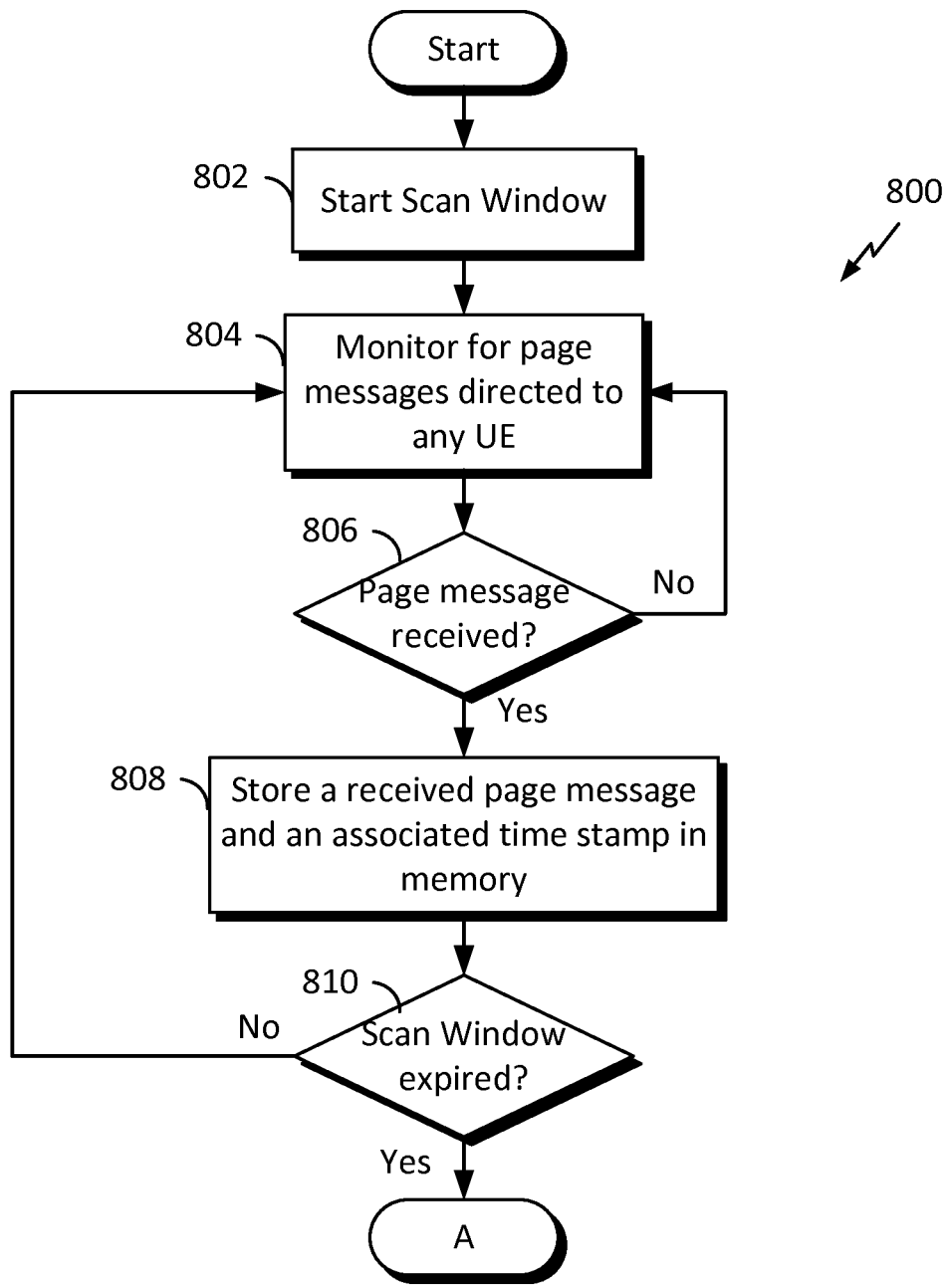
FIG. 8 is a flow chart illustrating an exemplary process for a UE in a passive scan mode according to some examples.

FIG. 8 is a flow chart illustrating an exemplary process corresponding to the passive scan mode, in accordance with some aspects of the disclosure. In the illustrated process 800, at step 802 the UE 550 may power-up and start a scan window, corresponding to a time period during which page messages or other suitable broadcast or downlink messages utilizing the DRX timing may be expected to transmit that information over the cell. The scan window may include any suitable number of DRX cycles adapted to be sufficient to enable the UE 550 to gather the desired data as described below.

In some aspects of the disclosure, the passive scan mode may be aborted before the end of the scan window, for example, if the UE 550 needs to respond to paging messages in the normal way.

At step 804, during the period of the scan window the UE 550 may monitor for page messages or other information directed to one or more UEs during the DRX cycles. That is, in accordance with an aspect of the disclosure, in order to gather better statistics about information transmitted on the paging channel, the UE 550 may be configured not only to look for messages directed to that UE 550, but in addition or in the alternative, to look for messages directed to other UEs as well. In this way, the UE 550 may be enabled to determine the repetition statistics of page messages over relatively few DRX cycles.

At step 806, the UE 550 may determine whether a page message (or, in some examples, any other suitable message may be sought within the DRX cycle) is received, and if not, the process may return to step 804 such that the UE 550 may continue to monitor for page messages. Here, the UE 550 is configured to monitor the paging channel for paging messages sent to any device, not just itself as it would be in a conventional network.

On the other hand, if a page message is received in step 806, then the process may proceed to step 808, wherein the UE 550 may store (e.g., in a memory 592) information corresponding to the received page message, along with an associated time stamp. For example, the UE 550 may store an identifier of the UE to which the message was directed, some or all of the message content so that repetition of the corresponding message may be determined, and a time stamp (or in some examples, a DRX cycle index) indicating the time at which that message was received. At step 810 the UE 550 may determine whether a scan window has expired. Here, a scan window may last any suitable duration of time, adapted to include a sufficient number of DRX cycles to enable the UE 550 to gather sufficient data in the memory 592 to determine the desired repetition statistics. That is, the loop between steps 804 and 808 may repeat a suitable number of times until a database including page message repetition data has been gathered, which can be analyzed as described below in relation to FIG. 10.

Figure 9:
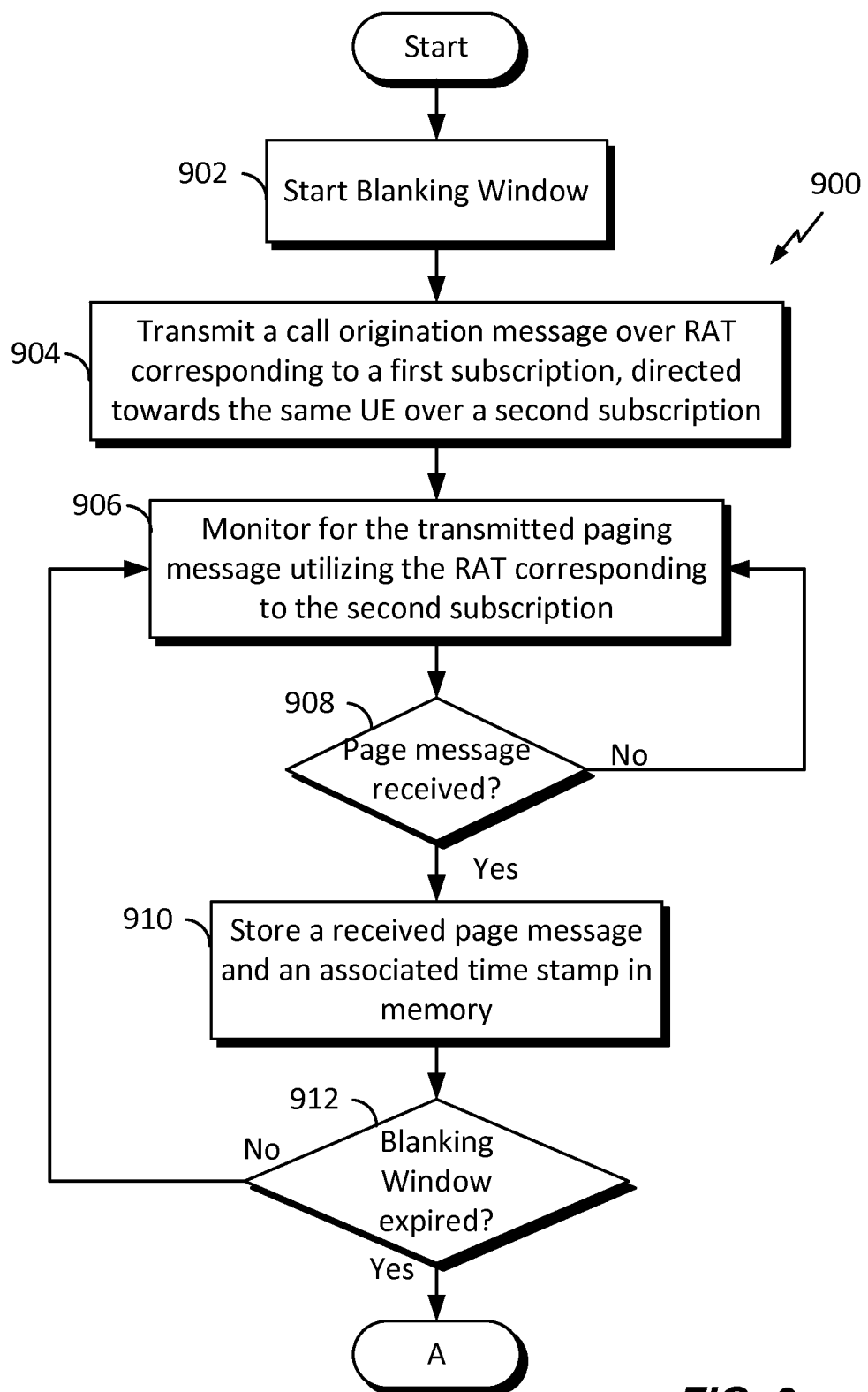
FIG. 9 is a flow chart illustrating an exemplary process for a UE in an active scan mode according to some examples.

Another aspect of the disclosure provides an active scan mode, which may be useful for multiple standby devices that include capabilities to communicate with two or more RANs and/or multi-SIM devices. FIG. 9 is a flow chart illustrating an exemplary process for a UE 550 corresponding to the active scan mode, in accordance with some aspects of the disclosure. In the illustrated process 900, at step 902, the UE 550 may initiate a "blanking window." Here, the blanking window is a designated, finite time during which time the UE 550 may receive, but does not respond to, one or more paging messages from one of the networks to which it is registered. During the duration of the blanking window, as described in further detail below, the UE 550 may attempt to reach one of its own radio devices using the other. In effect, the UE 550 may become both the originator and the recipient of a call attempt.

For example, at step 904 the UE 550 may transmit a message over a RAT corresponding to a first subscription, i.e., corresponding to a first USIM identity of a multi-standby device. This message may be a call origination message, including information for the network to initiate a call to that same UE 550 over a second subscription, corresponding to a second USIM identity of the multi-standby device. Next, at step 906, the UE 550 may monitor its normal paging channel utilizing a RAT corresponding to its second subscription, to seek for paging messages corresponding to the call initiated in step 904.

At step 908, the UE 550 may determine if the page message was received; if not, the process may return to step 906 to continue to await the paging message, and if so, the process may proceed to step 910, wherein the UE 550 may store information corresponding to the page message, along with an associated time stamp, in a memory 592.

Here, occurrences of page messages indicating they originated from the same UE 550 are logged into the dataset, but in an aspect of the disclosure, other page messages may be ignored. That is, during the blanking window used in the active scan mode, there is a possibility that the UE 550 may miss incoming page messages originating from other devices. Further, during the blanking window, the UE 550 is configured not to respond to the paging message as it normally would, but rather only to store the information associated with the received page in its memory 592 as described above.

At step 912, the UE 550 may determine whether the blanking window has expired, and if not, the process may return to step 906, and the UER 550 may continue monitoring for any repeated page attempts corresponding to the call originated in step 904.

That is, because the called party is configured not to respond to the incoming page message, the network may repeat the paging attempt several times before it determines that the intended recipient device is unreachable. During each of these attempts, repetition statistics may be gathered by the UE 550 if the network indeed is configured to repeat page messages as described above during each paging attempt.

Figure 10:
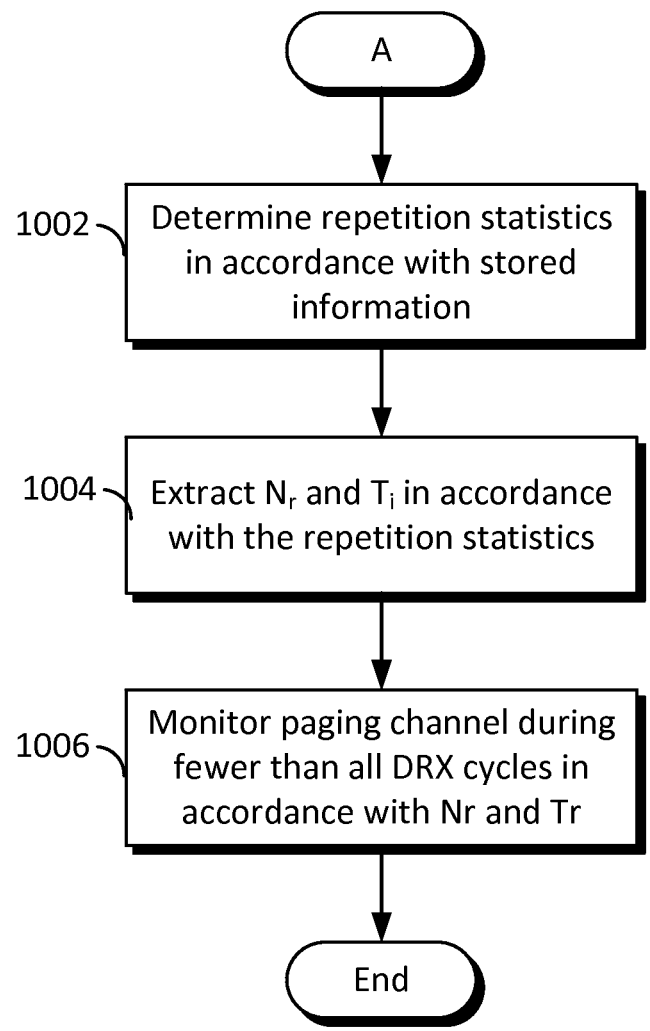
FIG. 10 is a flow chart illustrating an exemplary process for utilizing data stored in an active or passive scan mode to enable the monitoring of a paging/broadcast channel during fewer than all DRX cycles according to some examples.

At the end of the blanking window, the UE 550 may resume normal operation on both radio devices, and then mine the dataset to determine repetition statistics, as described below in association with FIG. 10.

In the passive scan mode, described above in relation to FIG. 8, and the active scan mode, described above in relation to FIG. 9, the UE 550 gathers information relating to repetition of incoming page messages and stores this information in its memory 592. In both these described processes, the illustrations show the process ending at a block labeled "A." In each of these figures, this "A" block corresponds to another block labeled "A" in FIG. 10. Here, the flow chart of FIG. 10 illustrates an exemplary process for analyzing this dataset to determine statistics relating to the repetition of the incoming page messages, and in some examples, to extract values for $N_r$ and each $T_i$. That is, in step 1002 the UE 550 may analyze collected information corresponding to the received page messages to determine whether the network is utilizing repeated attempts to reach any particular device that is listening to the channel.

Here, the UE 550 may look at the values of this data, such as the number of repetitions of the same user identity for each page message (i.e., the device to which each page message was directed), the content of the page message if stored, to determine if the received messages are in fact repetitions or possibly different incoming pages for the same device, the amount of time between each repetition, etc.

At step 1004, the UE 550 may accordingly extract values for $N_r$ and $T_i$ based on the determined repetition statistics. That is, the number of repetitions and the time between each repetition may be determined utilizing a suitable program for analyzing the stored page information. In some examples, the extracted values for $N_r$ and $T_i$ may further include an associated confidence value, indicating how confident the program is that the extracted values are correct. Repeated instances of repetition utilizing the same values of $N_r$ and $T_i$ can accordingly increase the confidence that these values would be used in the future by the network. If the program provides sufficient confidence in these values, then at step 1006 the UE 550 may immediately begin to utilize these values to reduce the frequency with which it monitors the channel. That is, the paging channel may be monitored during fewer than all DRX cycles in accordance with the extracted values of $N_r$ and $T_i$.

In a simple example such as the one illustrated in FIG. 7 where page messages are known always to be repeated during four consecutive DRX cycles, the UE 550 may be configured to monitor the paging channel only during every fourth DRX cycle. In this way, one of the repeated page messages would be received, In further detail, in one illustrative and non-limiting example, a UE 550 may be registered on a network that defines a DRX cycle ΔT of 470 milliseconds. This means that every 0.47 seconds, the UE 550 wakes from its sleep state, monitors its paging channel, and then returns to sleep.

After using either active or passive scan modes as described above, the UE 550 may then determine that the network is repeating paging messages for a minimum of 3 times, with a constant time interval of 940 milliseconds between each attempt ($N_r$=3, $T_1$=940 ms, and $T_2$=940 ms). In order to guarantee that the UE 550 can receive one of these repetitions, it needs only to wake from its sleep state every third DRX cycle, i.e., every 1.88 seconds. This represents a reduction in the UE's awake time of 75%, and hence, a corresponding reduction in power consumption.

Several aspects of a telecommunications system have been presented with reference to a UMTS W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

We claim:

1. A method of wireless communication operable at a user equipment capable of communicating over two different subscriptions, the method comprising:
    utilizing a transceiver to transmit a call origination message over a first subscription, the call origination message configured to initiate a call utilizing the first subscription to the same user equipment over a second subscription;
    utilizing the transceiver to receive over the second subscription at least one paging message corresponding to the call;
    storing at the user equipment information associated with the at least one paging message; and
    determining a statistic corresponding to repetition of the at least one paging message.

2. The method of claim 1, further comprising: monitoring a paging channel utilizing fewer than all paging cycles in accordance with the determined statistic.

3. The method of claim 1, wherein the receiving of the at least one paging message comprises monitoring a paging channel in accordance with a discontinuous reception (DRX) cycle.

4. The method of claim 1, wherein the storing of the information associated with the at least one paging message comprises storing a page message identifier and a time stamp corresponding to a time of receiving the at least one paging message.

5. The method of claim 1, wherein the statistic corresponding to the repetition of the at least one paging message comprises a minimum number of times the at least one paging message was repeated, and one or more times between repetitions of the at least one paging message.

6. The method of claim 1, further comprising:
    initiating a blanking window, during which the user equipment is configured to receive but not respond to incoming paging messages,
    wherein the receiving of the at least one paging message over the second subscription occurs during the blanking window.

7. A wireless communication device, comprising:
    a communications interface configured for wireless communication;
    a processor module operably coupled to the communications interface and configured for managing communications over two different subscriptions;
    the processor being further configured for:
    utilizing the communication interface to transmit a call origination message over a first subscription, the call origination message configured to initiate a call utilizing the first subscription to the same user equipment over a second subscription;
    utilizing the communication interface to receive over the second subscription at least one paging message corresponding to the call;
    storing at the wireless communication device information associated with the at least one paging message; and
    determining a statistic corresponding to repetition of the at least one paging message.

8. The device of claim 7, wherein the processor is further configured for monitoring a paging channel utilizing fewer than all paging cycles in accordance with the determined statistic.

9. The device of claim 7, wherein the receiving of the at least one paging message comprises monitoring a paging channel in accordance with a discontinuous reception (DRX) cycle.

10. The device of claim 7, wherein the storing of the information associated with the at least one paging message comprises storing a page message identifier and a time stamp corresponding to a time of receiving the at least one paging message.

11. The device of claim 7, wherein the statistic corresponding to the repetition of the at least one paging message comprises a minimum number of times the at least one paging message was repeated, and one or more times between repetitions of the at least one paging message.

12. The device of claim 7, wherein the processor is further configured for:
    initiating a blanking window, during which the user equipment is configured to receive but not respond to incoming paging messages, and
    receiving the at least one paging message over the second subscription during the blanking window.

13. An article of manufacture configured for use with a user equipment capable of enabling communication over two different subscriptions comprising a set of instructions stored on a storage device that when executed causes a processor of the user equipment to:
    utilize a transceiver to transmit a call origination message over a first subscription, the call origination message configured to initiate a call utilizing the first subscription to the same user equipment over a second subscription;
    utilize the transceiver to receive over the second subscription at least one paging message corresponding to the call;
    store at the user equipment information associated with the at least one paging message; and
    determine a statistic corresponding to repetition of the at least one paging message.

14. The article of claim 13, further comprising code that when executed causes the processor to monitor a paging channel utilizing fewer than all paging cycles in accordance with the determined statistic.

15. The article of claim 13, further comprising code that when executed cause the processor to receive the at least one paging message in a manner for monitoring a paging channel in accordance with a discontinuous reception (DRX) cycle.

16. The article of claim 13, further comprising code that when executed cause the processor to store the information associated with the at least one paging message in a manner for storing a page message identifier and a time stamp corresponding to a time of receiving the at least one paging message.

17. The article of claim 13, wherein the statistic corresponding to the repetition of the at least one paging message comprises a minimum number of times the at least one paging message was repeated, and one or more times between repetitions of the at least one paging message.

18. The article of claim 13, further comprising instructions that when executed cause the processor to:
    initiate a blanking window, during which the user equipment is configured to receive but not respond to incoming paging messages, and receive the at least one paging message over the second subscription during the blanking window.

* * * * *